(12) United States Patent
Mardberg

(10) Patent No.: US 6,480,779 B2
(45) Date of Patent: Nov. 12, 2002

(54) TWO-PEDAL VEHICULAR ACCELERATION CONTROL SYSTEM

(75) Inventor: Bjorn Mardberg, Gothenburg (SE)

(73) Assignee: Volvo Technological Development Corporation (SE)

( * ) Notice: Subject to any disclaimer, the term of this patent is extended or adjusted under 35 U.S.C. 154(b) by 0 days.

(21) Appl. No.: 09/681,707

(22) Filed: May 23, 2001

(65) Prior Publication Data

US 2001/0047235 A1 Nov. 29, 2001

Related U.S. Application Data

(60) Provisional application No. 60/206,830, filed on May 24, 2000.

(51) Int. Cl.$^7$ .................................................. G06G 7/76
(52) U.S. Cl. .............................. 701/70; 701/22; 701/69; 701/79; 180/170
(58) Field of Search .............................. 701/53, 68, 69, 701/70, 78, 79, 80, 81, 83, 22; 180/170

(56) References Cited

U.S. PATENT DOCUMENTS

| | | | | |
|---|---|---|---|---|
| 5,172,785 A | * | 12/1992 | Takahashi | 180/141 |
| 6,085,137 A | * | 7/2000 | Aruga et al. | 701/51 |
| 6,226,588 B1 | * | 5/2001 | Teramura et al. | 701/93 |

* cited by examiner

*Primary Examiner*—Gertrude Arthur
(74) *Attorney, Agent, or Firm*—Howrey, Simon, Arnold & White LLP

(57) ABSTRACT

System and method for controlling a vehicle that includes sensing driver control information from each of at least two foot actuated pedals of a vehicle. The sensed information is electronically analyzed and a driver desired vehicle acceleration is determined from the sensed information. An acceleration affecting system of the vehicle is then controlled to urge the vehicle toward the driver desired vehicle acceleration. The sensed driver vehicle control information may be translated into an electronic format suitable for being electronically analyzed, but in most instances will already be in such a format and no translation is necessary. Both positive and negative determinations of driver desired vehicle acceleration are accommodated which generally correspond to desired faster travel and desired slower travel, respectively, when the vehicle is in forward motion. An electronic control command is computed and utilized to control the acceleration affecting Environmentally imposed effects on the vehicle are considered in the computation of the electronic control command that is utilized in the step of controlling the acceleration affecting The acceleration affecting system is configured to include a power supplying sub-system and a braking sub-system, the power supplying sub-system and the braking sub-system establishing opposed acceleration affecting sub-systems.

15 Claims, 2 Drawing Sheets

TWO-PEDAL VEHICULAR ACCELERATION CONTROL SYSTEM

CROSS REFERENCE TO RELATED APPLICATIONS

This patent application claims the benefit of U.S. Provisional application No. 60/206,830 filed May 24, 2000.

BACKGROUND OF INVENTION

1. Technical Field

The present invention relates generally to a drive train control system for regulating vehicle acceleration and braking systems and for improving safety of vehicle operation at cruising speeds and low speed operation. More specifically, the invention relates to an electronic system adapted to adjust vehicle acceleration as desired and designated by the driver by way of an "intelligent" drive train, regardless of current traveling speed or terrain, and to monitor and control operation of brake and throttle systems for controlling the vehicle's velocity and direction of travel, as well as increasing the vehicle's operational efficiency

2. Background Art

The use of microprocessor controlled systems in automobiles has led to a bewildering array of options and driver controls, some of which, like tape and CD players, cellular phones, geo-positioning systems and the like present the possibility for diverting a driver's attention from the primary task of safe vehicle operation. On the other hand, some microprocessor controlled systems have simplified vehicle operation. Such systems include cruise control and climate control features that, once set, have the capability of automatically maintaining a specified condition until the driver adjusts the setting to modify that condition.

Cruise control systems are now well known as a valuable automotive option that allows a driver some degree of additional freedom of movement during long journeys because mental and physical effort is no longer required for maintaining a substantially constant speed of the vehicle. The resulting freedom reduces driver fatigue, because with cruise control, it is no longer necessary for the driver to continually maintain foot pressure against the accelerator pedal to keep a steady vehicle pace.

In today's modern vehicles, cruise control systems will maintain a selected speed over level ground and even add power for constant ascent speed of the vehicle up an incline. During downhill operation, however, conventional cruise control systems only have the option of reducing the throttle setting to allow the vehicle to coast against experienced drag forces such as that imposed by the gears of the transmission, friction and air. When a down-slope reaches a certain severity, there will be a tendency for an automobile to gain speed due to gravity when the cruise control is engaged, and even without power being supplied to the drive train.

A similar downhill increase in speed may also arise during normal vehicle operation without use of cruise control. The increase in speed may not be noticed by the driver and can detrimentally lead to traveling speeds above posted limits. In severe instances, excessive speed may endanger the lives of the driver and other occupants when safe operating conditions are exceeded. At such times, opportune activation of the braking system of the vehicle can return or maintain the vehicle at a safe speed. Such intervention could advantageously be automated so that driver recognition of the excessive situation is not required. Instead, the condition could automatically be sensed by onboard monitoring systems and appropriate control be taken over the vehicle using existing braking and power supply systems. This type of automated coordination between braking and acceleration would increase the safety factor associated with vehicle operation. Most advantageously, and as will be discussed in some detail hereinbelow, the control system for an integrated power train of the vehicle that incorporates both a power supplying sub-system and a braking sub-system can be provided which requires only that the driver indicate the degree of acceleration or deceleration that is desired. In the event that no acceleration change is indicated, constant speed will be maintained, even if that speed is zero, indicating a standing condition of the vehicle.

Another condition that could benefit from coordinated operation of braking and acceleration controls is low speed maneuvering, especially in high density traffic situations. A vehicle adapted for automatic application of brakes, to slow a vehicle or bring it to a complete stop, would allow a driver to become more alert concerning traffic activity in the vicinity of the vehicle.

Another disadvantage associated with conventional automobile design is the placement and configuration of the accelerator and brake pedals. In both automatic and manual transmission vehicles, the accelerator and brake pedals are designed to both be actuated with the driver's right foot. Necessarily, the driver must move his or her right foot between the pedals to change between powering and braking conditions. Oftentimes, the time that it takes to move the right foot from one pedal to the other and affect actuation of the second pedal is crucial; for instance, the delay caused by moving the right foot from the accelerator to the brake and engage the brake system can result in an accident that could have otherwise been avoided if immediate actuation of the brake pedal had been facilitated using the left foot.

This type of left foot control, however, is dissuaded by conventional pedal arrangement. Normally, the brake pedal is positioned sufficiently to the right near the accelerator that the left foot cannot be comfortably rested near or upon that pedal in a manner similar to that accommodated by the placement and configuration of the accelerator pedal for the right foot of the driver. Still further, the feel of the two pedals is different to the driver. The accelerator is biased toward the driver using a relatively soft spring so that a comparatively low foot pressure is required for changing or maintaining the degree to which the accelerator is depressed. Also, the accelerator is specially arranged so that the driver's right heel can be rested on the floor board below the accelerator, with the sole of the foot resting on the accelerator pedal engagement surface during travel.

On the other hand, the brake pedal is typically biased toward the driver using a substantially greater spring force so that more actuation pressure is required for operating the brake pedal than the accelerator pedal. As a result, the feel of the brake pedal to the driver is different from that of the accelerator pedal. Furthermore, because the brake pedal is intended to be engaged by the driver's right foot, the brake pedal is positioned substantially adjacent to the accelerator pedal at a distance from where the left foot of the driver will normally rest during typical driving conditions. As a result, conventionally configured and positioned brake pedals intentionally do not lend themselves to left foot actuation.

The intended right foot operation of the brake and accelerator pedals, however, is not always followed. This is especially true for very cautious driver's and others who tend to "ride" the brake during travel. This tendency is often fostered by the driver's desire to be able to quickly actuate the brake pedal, for instance, in an emergency situation. Because the brake pedal is not positioned for left foot actuation, undue driver fatigue can result because the left foot must be held at an uncomfortable position above or adjacent to the brake pedal, ready to take immediate action. Detrimentally, the condition of "riding" the brake often results as the brake pedal is unintentionally depressed to greater or lesser degrees during travel. This condition not only adversely affects performance and economy of the vehicle since the opposed braking and powering systems are simultaneously engaged, but undue wear and tear also result because of this simultaneous engagement. For instance, brake pads will have a much shorter operational life in the car of a driver who "rides" the brake than in one in which simultaneous pedal engagement is avoided. Therefore, it can be readily appreciated that a system that typically prevents such simultaneous engagement would be advantageous if included in standard, or at least optional vehicle designs.

In view of the above described deficiencies associated with the absence of acceleration-based input and control systems in conventionally designed vehicles, the present invention has been developed. These enhancements and benefits are described in greater detail hereinbelow with respect to several alternative embodiments of the present invention.

SUMMARY OF INVENTION

The present invention in its several disclosed embodiments alleviates the drawbacks described above with respect to conventionally designed vehicular acceleration control systems and incorporates several additionally beneficial features.

An electronically integrated drive train, including a braking sub-system and a powering sub-system, are individually, or as a system, controlled and operated based on driver input indicative of a desired acceleration, whether positive, negative or zero, to establish or maintain desired conditions during travel or stand-still of an automobile or similar vehicle.

Regarding the braking sub-system, there are at least two situations that benefit from the automated braking attributes associated with the present invention. One such situation occurs when the vehicle begins to gain speed while traveling downhill even though not intended by the driver. Unless the driver senses the added speed and manually corrects the condition by applying the brake, the vehicle will continue to gather momentum and increase travel speed. As earlier explained, this can lead to excessive, and usually unintentional operating conditions such as traveling at speeds exceeding posted and/or safe limits. A second exemplary situation occurs at erratic, but low travel speeds which is often indicative of involvement in "stop-and-go" heavy traffic. In such situations, the frequency of brake application increases in response to traffic conditions and interaction with other drivers necessitating frequent changes in travel speed that are accomplished through acceleration and deceleration of the vehicle. In conventional vehicles, these adjustments must continuously be manually made by the driver. According to the teachings of the present invention, the vehicle is electronically controlled for affecting acceleration and braking using driver input from one or two pedals. As a result, and as will be described in greater detail hereinbelow with respect to the two-pedal configuration, the driver is less prone to error caused by foot movement between the throttle and brake pedals. This also has the potential for increasing safety and avoiding crashes, especially at low speeds and in heavy traffic when vehicles are normally traveling close to one another.

Another benefit of this invention's automation of brake application relates to the need to hold a vehicle against drift on a slope, for instance, while waiting for a traffic light to change or traffic to move forward at an intersection arranged so that a driver is headed up hill from the necessitated stop. In extreme cases, substantial skill and coordination is required to prevent the vehicle from rolling backwards, downhill. Utilization of the control system of the present invention for controlling vehicle acceleration is also useful in avoiding vehicle speed increases or reductions that would normally be caused by environmental conditions such as traveling downhill or into a strong wind.

It is contemplated that a single foot pedal may be used by a driver for indicating whether acceleration or deceleration is desired, and the magnitude of that mode which is required. For instance, a single pivotal pedal may be utilized having a zero position. That zero position corresponds to no change in acceleration, and therefore constant velocity. Positions on opposite sides of this zero position correspond to forward acceleration and backward acceleration. In this context, backward acceleration also corresponds to slowing when the vehicle is traveling forward.

It should be appreciated that constant velocity may be negative, corresponding to steady backward travel; zero, corresponding to the vehicle standing in place; or positive, corresponding to steady forward travel. A range of motion for such a single pedal should be made available on either side of the zero position. The further away from the zero position into either of the two ranges that the pedal is positioned indicates an increase in magnitude of the acceleration desired to be applied to the integrated drive train, typically through application of a prescribed amount of power or braking force. Exemplarily, the further the control pedal is moved into the positive acceleration range, the more power, and hence the greater the acceleration that will be applied by the vehicle's power plant during typical forward travel. Similarly, the further the control pedal is moved into the negative acceleration range, the greater the braking force will be that is imposed upon the drive train during forward travel. In this context, it should be appreciated that a positioning of the pedal in the negative acceleration range may not necessarily add braking force if the natural drag experienced by the vehicle is sufficient to meet the requirement for deceleration specified by the driver through the pedal's position.

While the single pedal configuration constitutes an embodiment of the present invention, it can result in driver fatigue, particularly in heavy traffic situations, since a single foot of the driver is used for making all signals to the electronically controlled drive train and relaxation of that foot is only possible when the default configuration of the pedal is desired. While this single pedal configuration may not be problematic under highway driving conditions when the desired speed is relatively constant and acceleration change is not frequently required, it has the possibility for being less than optimal in stop-and-go traffic situations when constant manipulation will be required.

Resultingly, a preferred embodiment of the present invention is optimally mated with an automatic transmission and utilizes two foot pedals, each to be operated by one of the driver's two feet. One of the two pedals is associated primarily with positive acceleration and the other is primarily associated with negative acceleration, or deceleration during forward travel. Facility is made, however, for intelligent interpretation of combinations of various positions of these two pedals with the resulting interpretation producing a single electronic acceleration command utilized for controlling the integrated drive train system of the vehicle.

Modern vehicles utilizing an automatic transmissions require only two feet controls for speed adjustment, namely an accelerator pedal and a brake pedal. Before the advent of automatic transmissions, a vehicle's control system included three foot pedals requiring one foot to operate two pedals by moving the driver's right foot between accelerator and brake pedals. Despite the reduction to two pedals for automatic transmission control, the majority of drivers still use one foot, normally their right foot, to operate both pedals, especially since the pedals seem to be specially configured to foster such utilization and most new drivers are tutored in such usage. Typically, the other foot, or left foot, rests, unused on the floor at the left side of the foot well.

The improved foot pedal layout of the two-pedal embodiment of the present invention facilitates comfortable use of a two pedal speed adjustment system, with each foot assigned to a particular pedal. Suitable sizing and positioning of the left pedal (also referred to herein as the brake pedal) provides for left foot driver comfort and creates a situation wherein the driver's left foot rests with the heel on the floor board and the ball portion of the left foot resting against a vertically elongate pedal surface similar to the conventionally configured right pedal (also referred to herein as the accelerator pedal or just simply, the accelerator).

Exclusive right foot application upon the accelerator pedal and left foot application upon the brake pedal eliminates all delay previously associated with foot transfer from one pedal to the other thereby saving potentially precious time in an emergency situation or when the driver is traveling in close proximity to other vehicles. The utilization of a programmable microprocessor enables substantially immediate electronic sensing of the two pedal positions, interpretation of indicated driver input based on those sensed pedal positions, synthesis of that information, optionally together with other sensed information about the vehicle's condition, and then issuance of a resultant command to the electronically integrated power train of the vehicle which responds in a prescribed manner thereto.

In an exemplary operating embodiment, the present invention may initially apply programmed braking initiated by driver engagement of the brake pedal. Starting from a stationary condition, with the brake applied and no pressure being applied to the accelerator pedal, a vehicle requires an accelerating force from the power train to launch the vehicle into motion. As in currently available vehicles with automatic transmissions, a slight accelerating force is constantly communicated to the drive wheels, even when stopped and the brakes are engaged. The needed acceleration for launch is derived responsively from application of pressure to the accelerator pedal with the right foot while removing the left foot from the brake pedal. Automated control of brake force removal helps to prevent potentially jerky movement related to poor coordination of driver left and right foot movement. Still further, the "intelligently" controlled electronic power train will prevent excessive power input while the braking system remains activated. This prevents the two sub-systems from working one against the other thereby improving the efficiency of the controlled vehicle and reducing wear and tear at the same time.

Computer programmed control of brake release causes coordinated brake disengagement from the stationary condition to a travel mode in which the brake is fully disengaged, even during low speed operation. Also, as the vehicle slows, the braking pedal may be manually applied, with automatic brake assist, below the selected speed for gradual smooth deceleration. With suitable programming, the brakes may be automatically applied, below a certain speed, even without manual operation of the brake pedal. Using an information processing module (microprocessor) between the acceleration and braking system allows desired adjustment of both controls relative to an existing low speed condition. Utilization at low speed advantageously relies on a speed sensor for detecting when travel conditions are within a window of operation in which programmed coordination of brake pedal and accelerator pedal adjustment is most beneficial, and in what manner the coordination is to be affected.

A second opportune window of operation for automated drive train control coincides with high vehicle speeds when a legal speed limit may be exceeded or a vehicle inadvertently gathers momentum sufficient to raise the vehicle's speed to an unsafe level. The latter condition is most likely to occur with the vehicle traveling downhill with foot pressure relaxed over the accelerator pedal and no pressure applied to the brake pedal. An inattentive or otherwise distracted driver may not appreciate the occurrence of increased speed that can lead to undesirable consequences. Such consequences may be avoided using an automated braking system programmed to apply braking force to maintain a selected speed for the vehicle. Once again, a speed sensor may be used to detect a high speed condition requiring control by braking for vehicle deceleration.

The previous discussion presents an automated system according to the teachings of the present invention that utilizes a programmed controller to coordinate commands to an intelligent drive train based on driver input through two pedals. In the invention, the use of one or more algorithms, by way of a suitably programmed microprocessor, enables the positions of the two driver input pedals to provide information about the driver's desired acceleration for the vehicle, but avoids erratic or drifting control of the vehicle that commonly results in conventionally designed vehicles. At least in part, this avoidance of drift is accomplished by removing the need for driver input when no change to vehicle speed is required. Therefore, the system of the present invention automatically maintains either a still position of the vehicle or a constant backward or forward speed until a change is indicated by the driver by way of manipulation of one or both of the two foot pedals.

Still further, more than one combination of positions may be synthesized into a similar command to the drive train in an effort to minimize rigidity of the system as regards the driver. For instance, a one-half depression of the brake pedal and no depression of the accelerator may be interpreted similarly as is full depression of the brake pedal and a one-half depression of the accelerator. Not only the position of the pedals may be considered in the computation of the control command, but the rate of change of either pedal's movement may also be considered. For example, if the accelerator is being held to the floor, but the brake pedal is being pressed quickly toward the floor, a possible "intelligent" interpretation would be that an emergency situation is occurring and the right foot is being used to brace the driver, while the quickly advancing brake pedal indicates a desire for hard braking, even though the right pedal, or "accelerator" is fully depressed. It should be appreciated that these are only examples of possible interpretation scenarios; it should be appreciated that any variety of interpretive algorithms may be utilized, even those developed from test derived experience curves.

Not only is the input utilized to cause the vehicle to travel as desired by the driver, but the interpretive capabilities of the invention prevents the communication of detrimental commands to the drive train. That is, the invented system interprets contradictory input and derives a rationalized command that optimizes the vehicle's efficiency and avoids undue wear and tear on the vehicle, as well as maintains safe operating conditions.

The provision of the necessary communications called for by the present invention are easily accommodated. A conventionally designed CAN bus is typically provided in most modern vehicles and facilitates this invention's signal sharing between sensors, interpretive microprocessors, and electronically controlled systems such as the drive train and its several sub-systems.

In one embodiment, the present invention advantageously takes the form of a method for controlling a vehicle. The method includes sensing driver control information from each of at least two foot actuated pedals of a The sensed information is electronically analyzed and a driver desired vehicle acceleration is determined from the sensed information. An acceleration affecting system of the vehicle is then controlled to urge the vehicle toward the driver desired vehicle acceleration.

One or more of the following aspects may be included with the basic system parameters described immediately above. The sensed driver vehicle control information may be translated into an electronic format suitable for being electronically analyzed. In most instances, however, the information will already be in such a format and no translation is necessary. Both positive and negative determinations of driver desired vehicle acceleration may be accommodated which generally correspond to desired faster travel and desired slower travel, respectively, when the vehicle is in forward motion. An exception to this general rule, however, is described herein. An electronic control command can be computed and utilized to control the acceleration affecting Environmental imposed effects on the vehicle may be considered in the computation of the electronic control command that is utilized in the step of controlling the acceleration affecting The acceleration affecting system can be configured to include a power supplying sub-system and a braking sub-system, the power supplying sub-system and the braking sub-system establishing opposed acceleration affecting sub-systems. As a generally rule, vehicle efficiency will be optimized by avoiding simultaneous actuation of the opposed acceleration affecting sub-systems. In general, the power supplying sub-system is actuated to affect faster travel and the braking sub-system is actuated to affect slower travel. From a structural stand point, a rightwardly positioned foot pedal and a leftwardly positioned foot pedal may be provided in front of a driver's seat in the vehicle and the rightwardly and leftwardly positioned foot pedals are adapted to have similar physical characteristics and feel to a driver. A distance between the rightwardly and leftwardly positioned foot pedals is established that approximates the average distance between drivers' feet when at rest and in a sitting At least one of the foot pedals is adapted to be laterally adjustable for varying the distance between the rightwardly and leftwardly positioned foot pedals for accommodating different Most advantageously, the connection of the pedal to the lateral member is configured to be continuously adjustable across an adjustment length of the lateral member for accommodating accurate and fine-tuned adjustment. In a preferred embodiment, the connection would be configured to slide or slip upon the elongate lateral member. Each of the rightwardly and leftwardly positioned foot pedals are arranged so that proper placement of a driver's right foot and a driver's left foot, respectively upon the foot pedals, results in a heel of each foot resting upon a floor area below the corresponding foot pedal and a sole or ball of each foot engaged upon the corresponding and overhanging foot pedal's engagement surface. The rightwardly positioned foot pedal is configured so that driver actuation predominately influences a power supplying sub-system of the acceleration affecting system for urging faster travel when forward travel is occurring. Preferably, operation of the power supplying sub-system is affected using an electronically controlled fuel injection system. Oppositely to the rightwardly positioned foot pedal, the leftwardly positioned foot pedal is configured so that driver actuation predominately controls a braking sub-system of the acceleration affecting system for urging slower travel when forward travel is occurring.

The beneficial effects described above apply generally to the exemplary methods and systems for implementation that are disclosed herein for a vehicle control system based on driver desired acceleration characteristics. The specifics through which these benefits are enabled will be described in detail hereinbelow

BRIEF DESCRIPTION OF DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. Therefore, specific structural and functional details disclosed herein are not to be interpreted as limiting, but merely as a basis for the claims and as a representative basis for teaching one skilled in the art to variously employ the present invention.

Figure 1:
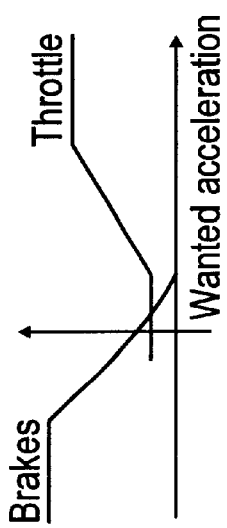
FIG. 1 provides a graphical representation of the magnitude of application of brake force and acceleration on the y-axis to achieve the driver "wanted acceleration" for the vehicle which is plotted on the x-axis. The graph is reflective of a vehicle driven by an automatic transmission and in stop-and-go traffic, or pulling to or launching from a stop. The vertical arrow denotes a desired acceleration change of zero magnitude, and typically a zero velocity, as well.

Reference to FIG. 1 shows a graphical diagram illustrating an exemplary relationship between driver desired acceleration for a vehicle and sample corresponding outputs induced in either the braking system, power (throttle) system, or both simultaneously. FIG. 1 represents one embodiment of a speed responsive and programmed control system according to the present invention that actuates power and brake controls of an integrated and electronically controlled power train of a vehicle for operating conditions in an operational range that is centered around a standing condition of the vehicle. More specifically, the diagram of FIG. 1 applies to a vehicle having automatic transmission such that speed increases, decreases or maintenance is governed by pedal controls actuated by the driver. Preferably, and as applies to this illustrative case, the vehicle has two similar foot pedals; a left pedal configured and positioned to be actuated by the left foot of the driver and identified for predominantly controlling braking action and a right pedal configured and positioned to be actuated by the right foot of the driver and identified for predominantly controlling power application to the drive train.

Referring still to FIG. 1 and as indicated above, the representative inputs to the integrated electronic drive train that are illustrated provide exemplary curve representations for an automatic transmission vehicle operating in a range substantially about the stopped condition. This representative curve most adequately describes operation of a vehicle as it slows to, or pulls away from a stop. Examples include stopping at an intersection and driving in stop-and-go traffic.

The vertical line in FIG. 1 represents zero desired acceleration, which also happens to often coincide with a zero velocity, or stand-still situation in this scenario. As labeled, the x-axis denotes wanted or desired acceleration as indicated by the driver's actuation of the two foot pedals. The two curves above the x-axis represent a magnitude of brake force application and throttle or power application. The brake application curve is predominantly positioned on the left or negative side of the vertical line, while throttle application is predominantly positioned on the right or positive side of a vertical line. In this scenario and for clearer understanding, the magnitude, or height above the x-axis may be thought of as corresponding to the amount of pressure imposed on conventional brake and accelerator pedals by a driver, though quite different in actuality because of the system's effects.

It should be appreciated that the behavior of the two sub-systems, braking and throttle, about the vertical line is typified by conventionally designed automatic transmissions and provides desired results in the presently controlled vehicle under limited circumstances. That is, marginal amounts of power are provided to the drive train system even when full brakes are applied and the vehicle is stopped. This fact can be appreciated in currently available automatic transmission automobiles in which the release of the brakes at a stoplight results in slow gradual forward movement of the car. In order to control this action, the driver keeps the brake applied as long as it is desired that the vehicle be stopped, and then the driver gradually releases the brake permitting the "idling" power of the engine to have an increased effect upon the drive train. The result is that in a slow travel mode when launching from a stop, brake action and throttle action are simultaneously applied to the drive train, though each in relatively small magnitudes or amounts. While this situation of opposed forces being simultaneously applied to the drive train is generally avoided according to the teachings of the present invention, the above described situation provides a limited exception where an advantageous result is obtained when both brakes and throttle are allowed to be simultaneously applied.

Referring still to FIG. 1 and the region of the curve to the left of the vertical line, a parallel can be drawn to an automobile that is stopped on an incline or in which conditions are changing which tend to move the vehicle into motion without input from the vehicle's power plant. In this situation, a driver is likely to desire to increase the brake force imposed for keeping the vehicle on station if there appears to be a risk that the brakes will loose hold. An extreme example would be a driver appreciating the fact that another vehicle is about to strike his own, and the brakes are applied harder in an effort to brace the vehicle against impact.

Figure 2:
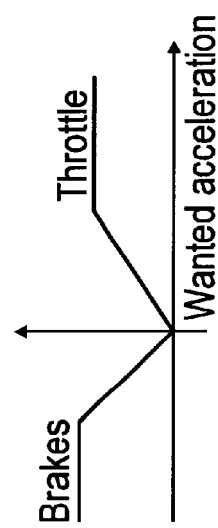
FIG. 2, like FIG. 1, provides a graphical representation of the magnitude of application of brake force and acceleration on the y-axis to achieve the driver "wanted acceleration" for the vehicle which is plotted on the x-axis. The graph is reflective of a vehicle being driven at a substantially constant velocity or a substantial speed above zero, even if not constant. The vertical arrow also denotes a desired acceleration change of zero magnitude, and the velocity is only constant, but not zero.

The performance curves of FIG. 1 can be compared to those of FIG. 2 in order to appreciate possible different reactions from the control system. For example, the characteristic curves of FIG. 1 would be advantageously utilized when the speed of the vehicle is relatively slow or approaching zero, but when the vehicle is moving at a greater traveling speed, the characteristic curves of FIG. 2 yield better system performance. The performance curve of FIG. 2 will be discussed in greater detail hereinbelow, but here it should still be appreciated that a primary difference between FIGS. 1 and 2 is that the vertical line of FIG. 2 represents a zero change in acceleration and constant non-zero velocity, as opposed to zero velocity as is the case in FIG. 1. In the traveling mode represented by FIG. 2, the braking and power sub-systems do not have cross-over performance thereby avoiding opposed inputs to the integrated drive train system.

What the existence of the two different response modes illustrated by FIGS. 1 and 2 evidences is that because the control system of the present invention is microprocessor based and programmable, performance variations may be instituted using algorithms, experience curves and the like, as well as sensed conditions about the vehicle such as travel speed, acceleration, and driver input from the two actuatable pedals provided in the passenger compartment. As a result, the performance of the control system of the present invention may be varied substantially, while still adhering to basic governing principles such as avoiding simultaneous application of opposed forces to the drive train, except in special situations such as stand-still, launch and stop-and-go traffic as is illustrated by the teachings of FIG. 1.

Preferably, the physical layout and configuration of the two provided foot pedals is varied from conventional placement and construction of accelerator and brake pedals. These changes have been made for improving driver comfort and reaction time compared to current arrangements in which it is intended, an therefore constructed, to encourage the driver to use his or her right foot exclusively to operate both the accelerator and brake pedals. In this invention, both pedals preferably have a similar shape so that the heel of each foot may rest on the vehicle floorboard with the sole of the foot remaining in contact with the engagement surface of the respective pedal. Movement of the brake pedal more to the left will provide a comfortable resting position for the left foot. An extension of the brake pedal's engagement surface towards the accelerator pedal may be included for driver's having difficulty in adapting from one foot to two foot control of acceleration and braking, but this should be generally avoided in order to gain the full potential from the invention's teachings.

Advantageously, one or both of the foot pedals may be constructed to be laterally movable. That is, the right, left or both pedals may be arranged to move closer to, or further away from one another. In this manner, differently sized driver's, as well as driver's having different natural spreads between their feet can be easily accommodated. The facilitation of such lateral movement can be provided as easily as mounting one or both of the pedals on an elongate lateral member with a mounting connection configured to be variously positioned along at least a portion of the lateral member. More elaborate configurations for accomplishing such an effect could be utilized and would be easily recognized by those skilled in the art as being satisfactory substitutes.

As indicated above, the performance characteristics illustrated by FIG. 2 will now be discussed in greater detail. As earlier intimated, the performance characteristic curves of FIG. 2 are typically utilized by the system for control purposes during vehicle travel; that is, either velocities of substantial magnitude or substantially consistent velocities. Therefore, the x-axis represents a driver supplied desired or wanted acceleration, while the vertical y-axis again represents magnitude of force applied to the integrated drive train from the brake and power plant sub-systems. The vertical line of FIG. 2, however, represents a desired zero change in acceleration, and not necessarily zero velocity as in FIG. 1; that is, in FIG. 2, the vertical line represents a constant velocity. In this situation, as opposed to that illustrated in FIG. 1, the "throttle" area to the right of the vertical line indicates a driver's desire for a positive change in acceleration typically resulting in greater velocity. The sense of the desired acceleration value, and not just its magnitude, however, is also important. Therefore, a positive desired or wanted acceleration could also represent a reduction in backward (negative) acceleration. Therefore, based on a detected condition of backward vehicle travel by the system, and a driver's input for positive change in acceleration, the desired result would initially be implemented by applying brakes. If positive acceleration continues to be indicated by the driver after a point of zero velocity (stopped) is obtained, the power system would then be activated by the system for forward power input to the drive train. This exemplifies the system's "intelligence" being utilized to most efficiently affect the driver's wishes. In the driver's mind, the desire is to move forward, even though the vehicle is currently moving backward and the right pedal will be actuated because the driver analogizes this pedal to an accelerator. An example of such a situation is a driver backing out of his or her driveway into the street for travel way from home. As the backing vehicle enters the street, and while still rolling backward, the driver's perception is that he or she wants to roll forward to progress onward with the trip on the street. The natural inclination is just to apply gas and use the engine to slow backward motion, stop the vehicle and then motor the vehicle forward for continuation of the journey. The intelligent system of the present invention detects this situation, and based either on reference to an experience data base, or purely from the driver's input from the two pedals, the system initially brakes the backward moving vehicle to a stop and then applies power to the drive train to affect forward travel. This is a more economic method for affecting the same result, while at the same time reducing wear and tear on the vehicle; each of which are highly desired benefits afforded by the present invention.

With reference again to the right portion of the curve of FIG. 2, for conformance with existing driver habits, performance in this region of the curve is predominately controlled by the rightward of the two pedals, the same generally being associated with an accelerator. Oppositely, the region of the plot of FIG. 2 positioned to the left of the vertical line represents a deceleration zone, typically characterized by brake application since forward travel is more common than backward travel.

An alternative representation of the deceleration zone may also incorporate an area adjacent to, and immediately at the left side of the vertical line where the plot of brake force would be coincident with the x-axis. Such an amendment to FIG. 2 would represent an appreciation of the fact that mild deceleration can normally be affected in a vehicle merely by ceasing the delivery of power to the drive train.

A further benefit of an electronically controlled and integrated drive train operated according to the teachings of the present invention is that it advantageously operates as a "cruise control" mechanism. As long as there is not driver input signaling a desired change in acceleration either to hasten or slow the vehicle's travel, a constant speed will be maintained. But as an even further benefit, the present system also has the capability for automatically restraining the vehicle to maintain constant speed, for instance in a downhill decent, by electronically applying brake action should gravity encourage a speed increase. In this manner, constant speed is able to be truly maintained in ways heretofore not facilitated by conventionally designed cruise control arrangements.

Figure 3:
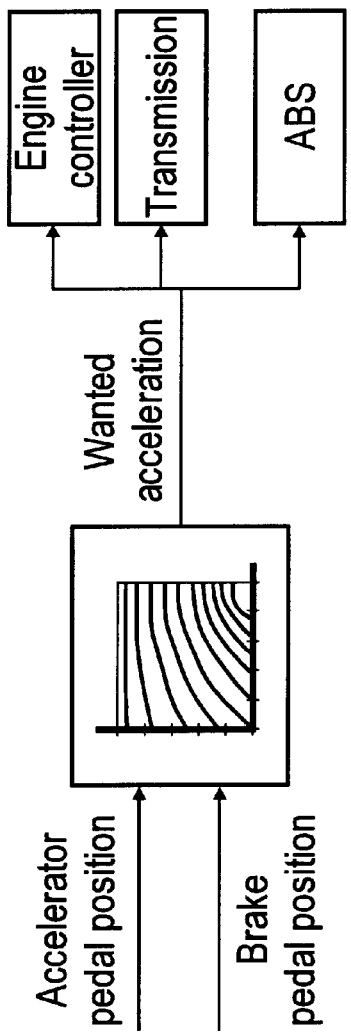
FIG. 3 is a schematic illustration of the cooperation of the electronically integrated power train according to the present invention showing a graphical representation of standard plots of acceleration force versus braking force as sensed from two driver controlled foot pedals and the utilization of a single integrated command signal to control the engine, transmission and brakes (ABS).

FIG. 3 provides a schematic illustration of the instant control system for an electronically integrated drive train for a vehicle. The driver's two pedal inputs are represented generally at the left side of the drawing. The "intelligence" or information processing components and characteristics of the system are graphically illustrated in the mid-section of the Figure. Those skilled in the art will readily appreciate the type of onboard computer(s)/microprocessor(s) presently available and suited for the described tasks, as well as the prescribed program functions. Regarding the illustration, it is graphically shown that the two-pedal driver input is sensed based on detected pedal positions and is then synthesized into a "wanted acceleration" parameter. This parameter is then converted into a command that is electronically communicated to the integrated drive train that incorporates control of the engine, transmission, and braking system; illustrated in that order from top to bottom at the right side of FIG. 2.

Figure 4:
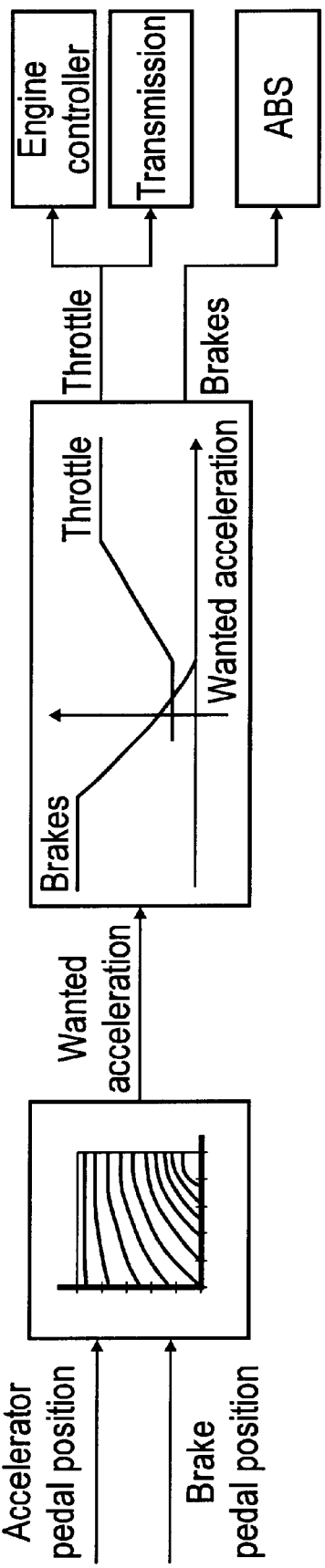
FIG. 4 is a schematic illustration similar to that of FIG. 3, but the sensed information graphically shown in the plotted portion of FIG. 3 is analyzed and read onto the plot of FIG. 2 regarding the magnitude and sense of the driver's desired acceleration. From the location of the point representing the driver's desired acceleration characteristics on the x-axis of the graph of FIG. 2, corresponding readings are made for braking and throttle control. These two parameters are then utilized, at least theoretically, to control as a sub-system the engine and transmission and as a separate sub-system, the brakes.

FIG. 4 expands the "intelligence" mid-portion of the system where it is shown that the synthesized "wanted acceleration" is then plotted on the graph of FIG. 2 for reading control parameters for the power and brake sub-systems. As described hereinabove, FIG. 4, through its incorporation of the characteristic curves of FIG. 2, is illustrative of system control for a vehicle that is traveling at speeds in excess of those normally experienced in stop-and-go traffic. Furthermore, because the control system is "intelligent" and has data storage capabilities, historical information about the vehicle's travel is also available so that it can be determined whether or not a heavy traffic situation is being experienced or that more consistent, but travel typical of open road or highway driving is being experienced. In either case, system logic can be utilized to determine whether or not the characteristics of FIG. 1 or FIG. 2 should be utilized.

FIG. 4 also differs from FIG. 3 in that the command to the integrated drive train system is logically bifurcated. That is, one control command may be thought of as being utilized for directing the power sub-system, which in the illustrated embodiment includes the engine and transmission, and a second control command may be considered as directing the braking system (ABS). This division between commands is schematically shown at the right side of FIG. 4. While in reality individual commands can be sent to any of the controlled sub-systems or their components by either of the command modules illustrated in FIGS. 3 and 4, FIG. 4 graphically illustrates that there may be certain circumstances, even when traveling at highway speeds, that throttle and brakes may be simultaneously applied, but possibly to different wheels. Again, this is a deviation from the normally overriding logic of the system that prevents simultaneous engagement of opposing inputs such as throttle and brakes, but certain circumstances may call for combined inputs, even if the control (either brake or power) is the same for any give wheel, but different between one or more of the several wheels.

Because control of the drive train by the present system is electronic and can be differently distributed to any of the various sub-systems (power and/or braking) of the drive train, and then subdivided even further with respect to sub-system components (individual wheel drive assemblies), it is contemplated that individualized control for separate wheels can be provided with respect to both power and braking. Therefore, the present invention can be utilized to improve traction, both from a powering and braking perspective, during normal travel and under extraordinary circumstances. For instance, a highly skilled driver could better control a vehicle in a sharp turn traveling at a high rate of speed if he or she were able to control the individual wheels as the present invention allows. Still further, such detailed control will also permit a driver to be more likely to gain control of an out-of-control vehicle if each wheel can be controlled either automatically or based on driver pedal input. In this vain, experience characteristic curves carried in the system may be automatically referenced, driver pedal input may be considered, or the system may utilize a combination of both types of input for ultimate vehicle control.

An integrated power train system configured and operated according to the teachings of the present invention provides increased safety and facilitates driver control over a vehicle. The system's components, as well as their performance have been described. These and other variations, which will be appreciated by those skilled in the art are within the intended scope of this invention as claimed below.

INDUSTRIAL APPLICABILITY

The present invention finds applicability in the vehicular arts, and especially in the automotive industry.

What is claimed is:

1. A method for controlling a vehicle, said method comprising:
sensing driver control information from each of at least two foot actuated pedals of a vehicle;
electronically analyzing said sensed information and determining a driver desired vehicle acceleration from said sensed information;
controlling an acceleration affecting system of said vehicle to urge said vehicle toward said driver desired vehicle acceleration; and
configuring said acceleration affecting system to include a power supplying sub-system and a braking sub-system, said power supplying sub-system and said braking sub-system establishing opposed acceleration affecting sub-systems.

2. The method as recited in claim 1, further comprising:
optimizing vehicle efficiency by avoiding simultaneous actuation of said opposed acceleration affecting sub-systems.

3. The method as recited in claim 1, further comprising:
accommodating positive and negative determinations of driver desired vehicle acceleration corresponding to driver desired faster travel and driver desired slower travel, respectively, during forward travel.

4. The method as recited in claim 1, further comprising:
actuating said power supplying sub-system to affect faster travel and actuating said braking sub-system to affect slower travel.

5. The method as recited in claim 1, further comprising:
translating the sensed driver vehicle control information into an electronic format suitable for being electronically analyzed.

6. The method as recited in claim 1, further comprising:
operating said power supplying sub-system using an electronically controlled fuel injection system.

7. The method as recited in claim 1, further comprising:
computing an electronic control command utilized to control said acceleration affecting system.

8. The method as recited in claim 7, further comprising:
considering environmental imposed effects on said vehicle in said computation of said electronic control command utilized in said step of controlling said acceleration affecting system.

9. The method as recited in claim 1, further comprising:
providing a rightwardly positioned foot pedal and a leftwardly positioned foot pedal in front of a driver's seat in said vehicle; and
adapting said rightwardly and leftwardly positioned foot pedals to have similar physical characteristics and feel to a driver.

10. The method as recited in claim 9, further comprising:
establishing a distance between said rightwardly and leftwardly positioned foot pedals that approximates the average distance between drivers' feet when at rest and in a sitting.

11. The method as recited in claim 9, further comprising:
adapting at least one of said foot pedals to be laterally adjustable for varying a distance between said rightwardly and leftwardly positioned foot pedals for accommodating different drivers.

12. The method as recited in claim 9, further comprising:
adapting a least one of said foot pedals to be continuously laterally adjustable across an adjustment range for varying a distance between said rightwardly and leftwardly positioned foot pedals for accommodating different drivers.

13. The method as recited in claim 9, further comprising:
arranging each of said rightwardly and leftwardly positioned foot pedals so that proper placement of a driver's right foot and a driver's left foot, respectively upon said foot pedals, results in a heel of each foot resting upon a floor area below the corresponding foot pedal and a ball of each foot engaged upon the corresponding and overhanging foot pedal.

14. The method as recited in claim 9, further comprising:
configuring said rightwardly positioned foot pedal so that driver actuation of said rightwardly positioned foot pedal predominately influences a power supplying sub-system of said acceleration affecting system for urging faster travel.

15. The method as recited in claim 9, further comprising:
configuring said leftwardly positioned foot pedal so that driver actuation of said leftwardly positioned foot pedal predominately controls a braking sub-system of said acceleration affecting system for urging slower travel.

* * * * *